(12) United States Patent
Bae et al.

(10) Patent No.: US 12,158,798 B2
(45) Date of Patent: Dec. 3, 2024

(54) PROVIDING SOLUTIONS ON AN ERROR OCCURRED

(71) Applicant: Hewlett-Packard Development Company, L.P., Spring, TX (US)

(72) Inventors: Sung Hoon Bae, Seongnam-si (KR); Ki Young Hwang, Seongnam-si (KR); Han Sung Kim, Seongnam-si (KR); Ho Sung Han, Seongnam-si (KR); Seung Wook Hong, Seongnam-si (KR); Han Nam Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 5 days.

(21) Appl. No.: 18/023,803

(22) PCT Filed: Mar. 11, 2021

(86) PCT No.: PCT/US2021/021861
§ 371 (c)(1),
(2) Date: Feb. 28, 2023

(87) PCT Pub. No.: WO2022/060410
PCT Pub. Date: Mar. 24, 2022

(65) Prior Publication Data
US 2023/0315562 A1 Oct. 5, 2023

(30) Foreign Application Priority Data
Sep. 18, 2020 (KR) .................. 10-2020-0120305

(51) Int. Cl.
*G06F 11/07* (2006.01)

(52) U.S. Cl.
CPC ...... *G06F 11/0793* (2013.01); *G06F 11/0733* (2013.01); *G06F 11/079* (2013.01)

(58) Field of Classification Search
CPC . G06F 11/0793; G06F 11/0733; G06F 11/079
See application file for complete search history.

(56) References Cited

U.S. PATENT DOCUMENTS

| | | | |
|---|---|---|---|
| 9,092,231 B2 | 7/2015 | Park | |
| 10,063,719 B2 | 8/2018 | Shin et al. | |
| 11,106,568 B2 * | 8/2021 | Abdelhalim | G06F 8/71 |
| 11,126,491 B2 * | 9/2021 | Kobayashi | G06F 11/0751 |
| 11,947,417 B2 * | 4/2024 | Yerradoddi | G06N 3/045 |
| 2001/0011260 A1 | 8/2001 | Skaanning et al. | |

(Continued)

FOREIGN PATENT DOCUMENTS

| | | |
|---|---|---|
| JP | 2012-212266 A | 11/2012 |
| JP | 2019-133294 A | 8/2019 |

*Primary Examiner* — Nadeem Iqbal
(74) *Attorney, Agent, or Firm* — Brooks, Cameron & Huebsch, PLLC

(57) ABSTRACT

An example error handling method includes detecting an error in an image forming apparatus, transmitting error information regarding the detected error to an external apparatus, identifying an error category based on the error information, providing a solution corresponding to the error information to the image forming apparatus based on the identified error category, transmitting result information obtained by applying the provided solution to the external apparatus, and updating the provided solution based on the result information.

15 Claims, 16 Drawing Sheets

(56) References Cited

U.S. PATENT DOCUMENTS

| | | |
|---|---|---|
| 2003/0110412 A1 | 6/2003 | Neville |
| 2004/0057767 A1 | 3/2004 | Parry |
| 2004/0239713 A1 | 12/2004 | Kang |
| 2011/0185220 A1 | 7/2011 | Foley et al. |

\* cited by examiner

A image forming apparatus may refer to an apparatus
PROVIDING SOLUTIONS ON AN ERROR OCCURRED

BACKGROUND

An image forming apparatus may refer to an apparatus which prints print data generated on a terminal apparatus such as a computer on a print medium such as paper. Examples of an image forming apparatus may include a copier, a printer, a facsimile, a scanner, and a multi-function peripheral (MFP) realizing functions of these with one apparatus in combination.

DETAILED DESCRIPTION

Figure 1:
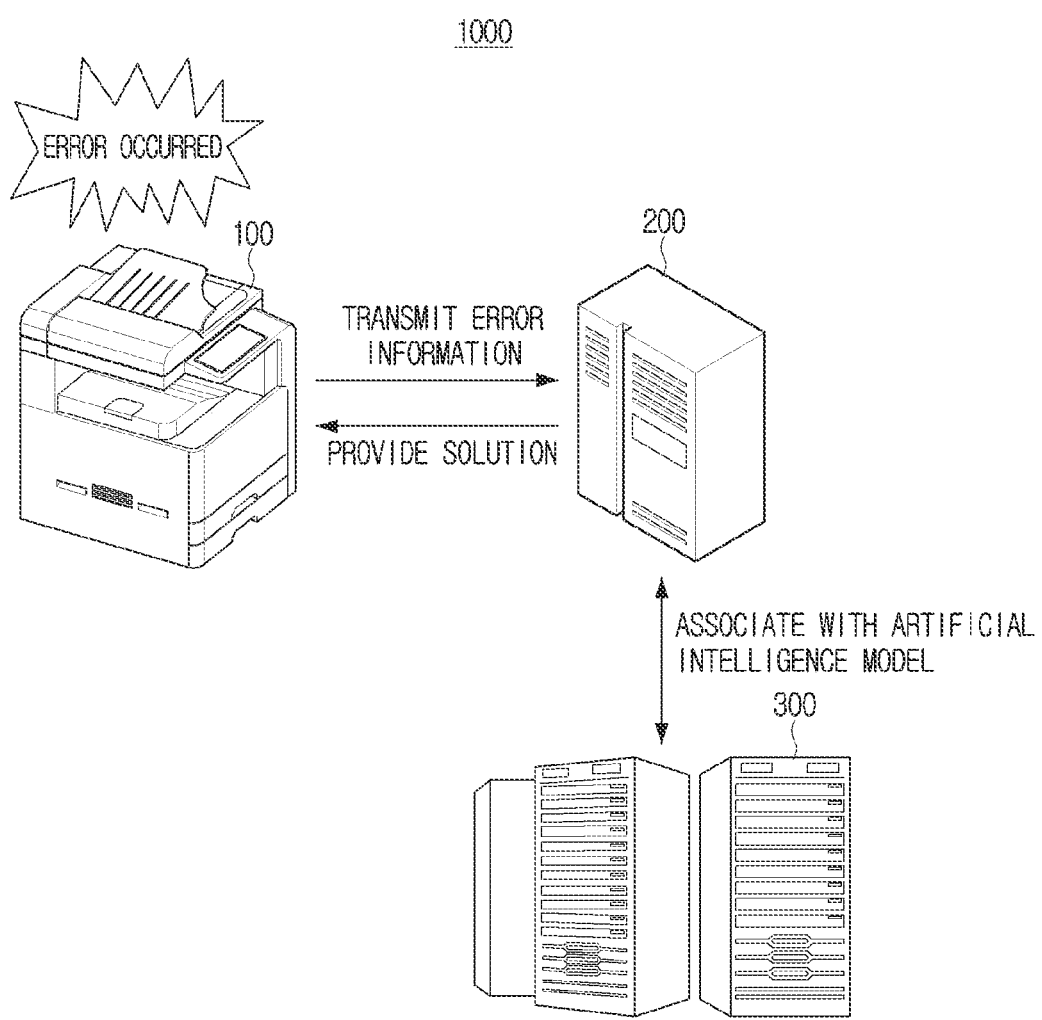
FIG. 1 is a diagram illustrating an image forming system according to an example.

Hereinafter, various examples will be described with reference to the drawings. The examples described hereinafter may be modified in various different forms.

In this specification, an expression that a certain component is "connected" to another component not only includes a case where the components are "directly connected to each other," but also a case where the components are "connected to each other with another component interposed therebetween." In addition, when a certain component "includes" another certain component, it implies that a still another component may be further included, rather than excluding it, unless otherwise noted. Each example may be independently implemented or operated, and the examples may be implemented or operated in combination.

In the disclosure, an "image forming job" may refer to any of various jobs (e.g., copying, printing, scanning, or faxing) relating to an image such as forming of an image or generating, saving, or transmitting of an image file, and the "job" may not only include the image forming job, but also include any process necessary for performing the image forming job.

An "image forming apparatus" may refer to an apparatus which prints print data generated on a terminal apparatus such as a computer on a recording medium such as paper. An example of an image forming apparatus may include a copier, a printer, a facsimile, a scanner, and a multi-function peripheral (MFP) realizing functions of these with one apparatus in combination.

An "external apparatus" may refer to an apparatus which provides information or a service to an image forming apparatus via a network. For example, the external apparatus may be a server, a cloud, a web server, a host apparatus, a user terminal apparatus, and the like. If the external apparatus is a server, an example of the server may include a payment server, a management server, and the like. The service may be provided from one physical server or may be provided from a virtual server (e.g., a cloud server) separated from the one physical server. In this specification, a plurality of external apparatuses may be provided. For example, one external apparatus may be a general server which performs an operation for error handling of an image forming apparatus and another external apparatus may be an artificial intelligence (AI) cloud (e.g., an AI server) which learns errors and solutions and generates a trained error resolution model.

In an example, an error handling method of an image forming apparatus may include an "automatic mode," a "manual mode," and a "custom mode." An example of an automatic mode may include a method for automatically transmitting error information to a server and automatically applying a solution received from the server based on a priority order. An example of a manual mode may include a method for transmitting error information to a server by selection of a user and applying a solution selected by the user among solutions received from the server. An example of a custom mode may include applying a solution similarly as in the manual mode. In addition, an example of a custom mode may include a method for, if there is no solution directly related to error information, performing an error handling process by the user by referring to a related solution provided from the server based on a message transmitted to a server by the user.

Various errors may occur during usage of an electronic apparatus including an image forming apparatus. In general, in order to address an error that has occurred, a manufacturer may update firmware or provide a frequently asked questions (FAQ) and guide for various types of problems on a homepage. However, it may be difficult for a user to identify a type of an error that has occurred or apply a suitable solution thereto. In addition, since the firmware update and the guide for various types of problems may be provided after accumulating data, the user may experience difficulty to address a problem in real time.

Examples of the disclosure provide a method for confirming an error that has occurred on an image forming apparatus in real time and providing a solution suitable for the confirmed error to a user in real time.

FIG. 1 is a diagram illustrating an image forming system according to an example.

Referring to FIG. 1, an image forming system 1000 may include an image forming apparatus 100, a server 200, and an AI cloud (e.g., an AI server) 300. FIG. 1 illustrates an example in which the image forming apparatus 100 and the server 200 are connected to each other via a network and the server 200 and the AI cloud 300 are connected to each other via a network. However, in an example, the image forming apparatus 100 may be connected to the AI cloud 300 via a network and may transmit data related to an error to the AI cloud 300.

When an error occurs on the image forming apparatus 100, the image forming apparatus 100 may detect the error. The image forming apparatus 100 may transmit information regarding the error to the server 200. For example, error information regarding the error may include product information, log information, setting information, and the like. In addition, the error information may further include an error code or an input error-related message.

The server 200 may identify an error category based on the received error information using an artificial intelligence model. For example, when the received error information includes an error code, the server 200 may identify the error category based on the error code. In addition, the server 200 may identify the error category based on the input error-related message. The input error-related message may be a message input by a user (e.g., an administrator, a service engineer, etc.). The error category may be classified by the AI cloud 300.

In an example, the user may input a message including an expression such as "paper jammed," "abnormal paper feeding," "paper is not fed," and the like. The server 200 may identify an error, which in this case is "paper jam," and an error category based on the received expression using the trained artificial intelligence model. In addition, the server 200 may identify the error category by confirming an error code corresponding to the "paper jam."

The server 200 may provide a solution corresponding to the error information received from the image forming apparatus 100 to the image forming apparatus 100 based on the identified error category. For example, the server 200 may provide a plurality of solutions arranged in order of priority. The priority order of the solutions may be determined based on error resolution results accumulated in the server 200 or set by updated scores. The plurality of solutions may be provided one by one in sequence according to the mode of the image forming apparatus 100 or may be provided as a list in which the solutions are listed according to the priority order.

In an example, the image forming apparatus 100 may include the automatic mode, the manual mode, and the custom mode in regard to the handling of the error.

When the image forming apparatus 100 is set in the automatic mode, the image forming apparatus 100 may automatically transmit the error information to the server 200 and receive a solution related to the error automatically from the server 200. The image forming apparatus 100 may receive a solution having a highest (e.g., first) priority related to the error and apply the received solution. When the error is resolved, the image forming apparatus 100 may transmit result information including a message related to the error resolution and an error resolution completion message to the server 200. If the error is not resolved with the solution having the first priority, the image forming apparatus 100 may receive a solution having a next highest (e.g., second) priority and apply the received solution. The image forming apparatus 100 may repeat the above process with respect to all solutions related to the error. If the error is not resolved although all of the solutions are applied, the image forming apparatus 100 may notify a result indicating that the error is not resolved to the server 200 and the user.

When the image forming apparatus 100 is set in the manual mode, the image forming apparatus 100 may transmit the error information to the server 200 according to selection of the user. The image forming apparatus 100 may receive solutions related to the error as a list in an order of priority. The user may select one solution from the list of solutions and the image forming apparatus 100 may apply the selected solution. When the error is resolved, the image forming apparatus 100 may transmit the result information including the message related to the error resolution and the error resolution completion message to the server 200 and notify the result indicating that the error is resolved to the user. If the error is not resolved with the selected solution, the image forming apparatus 100 may receive a next solution selected by the user and apply the next selected solution. The image forming apparatus 100 may repeat the above process until the error is resolved.

When the image forming apparatus 100 is set in the custom mode, the image forming apparatus 100 may transmit the error-related message input by the user to the server 200. For example, the image forming apparatus may transmit the error information selected by the user with respect to an error not detected with error diagnosis to the server 200. The server 200 may determine solution information related to the error using an artificial intelligence model based on the received error information and transmit the solution information to the image forming apparatus 100. The user may perform error handling by referring to the solution information received from the server 200. The image forming apparatus 100 may transmit result information input by the user to the server 200. In an example, the result information may include an error code, an error handling code, setting information, an error category, a type of error handling, success or not of error handling, a time taken from the start to the end of error handling, an error handling process, a description (comment), additional service necessity or not, and the like.

The server 200 may update the solution based on the error handling result information. For example, the server 200 may apply a negative (−) score to a solution which has not resolved the error or may apply a positive (+) score to a solution which has resolved the error among the provided solutions. In addition, the server 200 may record the number of times of handling of the error, the number of times of success, the time taken for error handling, and the like with respect to each solution. The server 200 may transmit the information regarding the error handling result to the AI cloud 300.

The AI cloud 300 may train the artificial intelligence model by reflecting the error handling result received from the server 200. As an example, the AI cloud 300 may update the artificial intelligence model to a model with a higher accuracy using the error handling result received from the server 200. In addition, the AI cloud 300 may generate an artificial intelligence model for error handling based on various errors and a solution with respect to each error. For example, the AI cloud 300 may set an evaluation score using a weight by applying each of the plurality of solutions to the artificial intelligence model based on the error resolution result.

For example, the AI cloud 300 may set a score by applying each of the plurality of solutions to the artificial intelligence model based on the error resolution result. The AI cloud 300 may update the solution based on the score obtained by adding or subtracting points according to the error resolution information and determine the priority order of the updated solution. In addition, the AI cloud 300 may update the artificial intelligence model based on the updated solution. In an example, the server 200 may transmit the error information or the result information applied with the solution to the AI cloud 300. The AI cloud 300 may update the solution based on the information received from the server 200 and update the artificial intelligence model. In an example, the AI cloud 300 may receive the error information regarding the error from the image forming apparatus 100.

The AI cloud 300 may classify the error of the image forming apparatus 100 into the category based on the generated artificial intelligence model and provide a suitable solution to the server 200 based on the error and the classified category.

Figure 2:
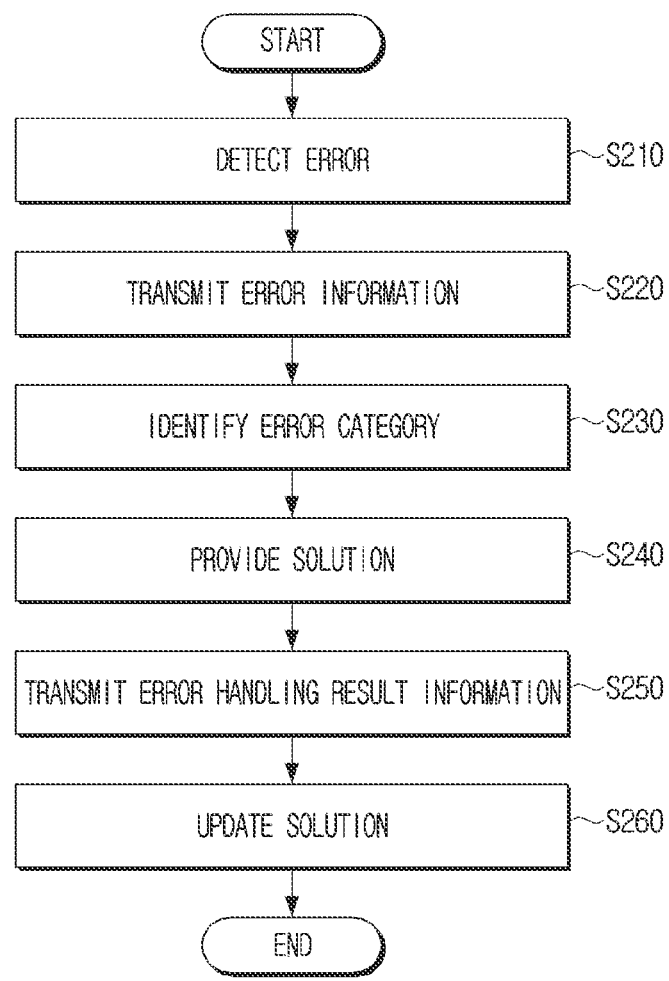
FIG. 2 is a flowchart illustrating an error handling method according to an example.

FIG. 2 is a flowchart illustrating an error handling method according to an example.

Referring to FIG. 2, an image forming apparatus may detect an occurrence of an error in operation S210 and transmit error information regarding the detected error to an external apparatus in operation S220. The image forming apparatus may transmit the error information to the external apparatus based on a set error diagnosis method. For example, the error diagnosis method may include the automatic mode, the manual mode, and the custom mode. The error information may include product information, log information, setting information, and the like. The error information may further include an error code or an input error-related message. The input error-related message may be information input by a user in relation to the error. For example, the external apparatus may be a server which provides a solution regarding error handling of the image forming apparatus. In addition, the external apparatus may be an AI cloud which generates and manages an artificial intelligence model. If the external apparatus is an AI cloud, the external apparatus may provide a resolution with high reliability by updating the artificial intelligence model related to the error based on the received error information.

The external apparatus may identify an error category based on the received error information in operation S230. When the external apparatus receives the error code, the external apparatus may identify the error category based on the error code. In addition, when the external apparatus receives the error-related message, the external apparatus may identify one error category corresponding to the error information based on the received error-related message among a plurality of error categories based on the artificial intelligence model.

The external apparatus may provide a solution regarding the received error information in order of priority to the image forming apparatus based on the identified error category in operation S240. The image forming apparatus may handle the error based on the provided solution.

For example, a score may be set with respect to each solution. The score of each solution may be set through the artificial intelligence model. The external apparatus may identify the solution related to the error information among the plurality of solutions set with scores, respectively. The external apparatus may confirm the priority order of the solution based on the set score. The external apparatus may provide the solution to the image forming apparatus in the order of priority.

In an example, if the image forming apparatus is in the automatic mode, the external apparatus may first provide a solution having the highest priority in relation to the error. The image forming apparatus may handle the error with the provided solution. If the error is not resolved, the image forming apparatus may receive a solution having the second highest priority from the external apparatus. The image forming apparatus may handle the error with the provided solution. The image forming apparatus may automatically repeat the above process. If the error on the image forming apparatus is not resolved in the automatic mode, the image forming apparatus may change the mode so as to resolve the error in the manual or custom mode.

Alternatively, if the image forming apparatus is in the manual mode, the image forming apparatus 100 may transmit the error information to the external apparatus according to the selection of the user. The external apparatus may provide a list of solutions in order of priority in relation to the error. The image forming apparatus may display the provided solution list. The image forming apparatus may handle the error with a solution selected by the user. If the error is not resolved, the image forming apparatus may receive a next solution selected by the user and handle the error with the selected next solution. The image forming apparatus may repeat the above process.

Alternatively, if the image forming apparatus is in the custom mode, the image forming apparatus may transmit the error-related message input by the user to the external apparatus. The external apparatus may transmit solution information related to the error to the image forming apparatus using the artificial intelligence model based on the received error information. The user may handle the error by referring to the solution information received from the external apparatus.

The image forming apparatus may transmit result information obtained using a solution to the external apparatus in operation S250. For example, the result information may include error resolution information, information indicating that the error is not resolved, an action message related to resolution of the error, and the like.

The external apparatus may update a solution based on the result information in operation S260. As an example, the external apparatus may subtract points from the score of the solution when the result information indicates that the error is not resolved, and may add points to the score of the solution when the result information indicates that the error is resolved. The external apparatus may update a priority of the solution based on the score with the added or subtracted points. In addition, the external apparatus may update a related solution based on the action message related to the resolution of the error. If the external apparatus that received the result information from the image forming apparatus is a server, the server may transmit the error handling result information or information regarding the updated solution to the AI cloud. When the AI cloud receives the error handling result information, the above process may be performed by the AI cloud. In addition, the AI cloud may train the artificial intelligence model based on the received error handling result information or information regarding the updated solution to update the artificial intelligence model to an optimal model.

Figure 3:
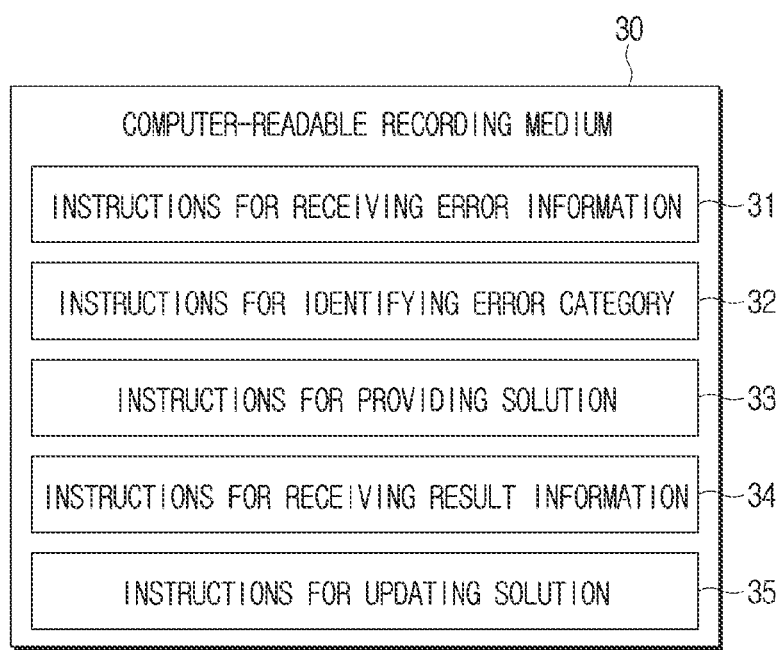
FIG. 3 is a diagram illustrating instructions stored in a non-transitory computer-readable recording medium according to an example.

FIG. 3 is a diagram illustrating instructions stored in a non-transitory computer-readable recording medium according to an example.

Referring to FIG. 3, the error handling process executed in the server may be implemented in a non-transitory computer-readable recording medium storing instructions or data executable by a computer or a processor. A non-transitory computer-readable recording medium 30 may store instructions related to example operations of a server described above. For example, the non-transitory computer-readable recording medium 30 may include instructions 31 for receiving error information regarding an error that has occurred at the image forming apparatus, instructions 32 for identifying an error category based on the received error information, instructions 33 for providing a solution regarding the error information based on the identified error category, instructions 34 for receiving result information obtained using the solution, and instructions 35 for updating the solution based on the received result information.

Such a non-transitory computer-readable recording medium may be a read-only memory (ROM), a random-access memory (RAM), a flash memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a magnetic tape, a floppy disk, a magneto-optical data storage device, an optical data storage device, a hard disk drive, a solid state drive (SSD), and any device capable of storing instructions, software, related data, a data file, and a data structure, and capable of providing the instructions, the software, the related data, the data file, and the data structure to a processor or a computer for the processor or the computer to execute the instructions.

Hereinabove, an example error handling method has been descried. Examples of an image forming apparatus and a server of an error handling system will be described below.

Figure 4:
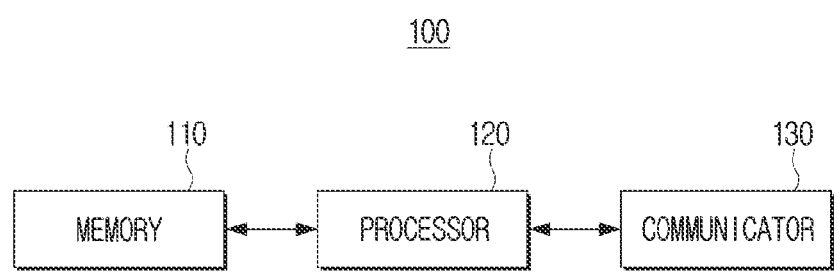
FIG. 4 is a block diagram illustrating an image forming apparatus according to an example.

FIG. 4 is a block diagram illustrating an image forming apparatus according to an example.

Referring to FIG. 4, the image forming apparatus 100 may include a memory 110, a processor 120, and a communicator 130.

The memory 110 may store an instruction regarding the image forming apparatus 100. For example, the memory 110 may store various programs (or software) for the image forming apparatus 100 to operate according to various examples of the disclosure. In addition, the memory 110 may store an error diagnosis module and an error diagnosis setting module. The error diagnosis setting module may be included in the error diagnosis module. The error diagnosis module stored in the memory 110 may be loaded to the processor 120 and may perform operations related to the error diagnosis under the control of the processor 120.

The processor 120 may control an operation of the image forming apparatus 100. The processor 120 may transmit error information and apply the received solution according to the method set in the error diagnosis setting module. For example, the method set in the error diagnosis setting module may include the automatic mode, the manual mode, and the custom mode. The processor 120 may detect an error in the image forming apparatus 100 using the error diagnosis module. The processor 120 may transmit and receive the information related to the error and the solution to and from the external apparatus via the communicator 130. As an example, the processor 120 may transmit the error information to the external apparatus via the communicator 130 and receive the solution from the external apparatus via the communicator 130 according to the set mode. The processor 120 may confirm a priority order of the solution based on the score of the received plurality of solutions. The processor 120 may apply the solution according to the set mode. For example, in a case of the automatic mode, the processor 120 may apply the solutions in sequence beginning with the solution having the highest priority among the received solutions. In a case of the manual mode, the processor 120 may apply the solutions in an order selected by the user. The processor 120 may transmit the result information indicating that the error is handled to the external apparatus via the communicator 130.

The communicator 130 may communicate with the external apparatus. For example, the external apparatus may include a server, an AI cloud, and the like. The communicator 130 may connect the image forming apparatus 100 to the external apparatus and may be connected via a wired communication port (e.g., a universal serial bus (USB) port) or a wireless communication port (e.g., WiFi 802.11a/b/g/n, near field communication (NFC), Bluetooth), in addition to the connection to the external apparatus via a local area network (LAN) or the Internet. Such a communicator 130 may be referred to as a communication interface or a transceiver.

The communicator 130 may transmit the error information regarding the error to the external apparatus. The communicator 130 may receive a solution from the external apparatus. When the processor 120 handles the error by applying the received solution, the communicator 130 may transmit the result information obtained by handling the error to the external apparatus.

Although not illustrated in FIG. 4, the image forming apparatus 100 may further include a display to display an execution screen of an application program, data such as a user interface, and the like. For example, the display may be implemented as a liquid crystal display (LCD), a light emitting diode (LED), an organic LED (OLED), a flexible display, a touch screen, and the like. In addition, the image forming apparatus 100 may further include a print engine to form an image on an image forming medium on which an image is formed such as a photosensitive drum, an intermediate transfer belt, and a print medium feeding belt, a speaker to output received information and the like as a sound, an input device to receive a user's command, and the like.

Figure 5:
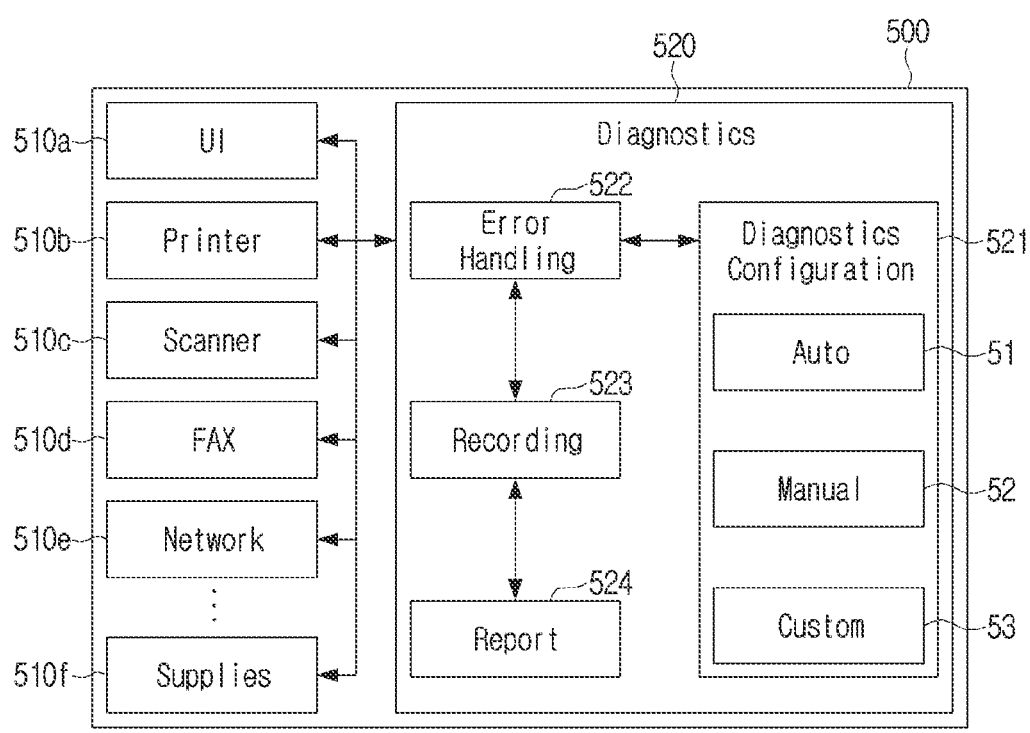
FIG. 5 is a block diagram illustrating operations of an image forming apparatus according to an example.

FIG. 5 is a block diagram illustrating operations of an image forming apparatus according to an example.

Referring to FIG. 5, an image forming apparatus 500 may include a User Interface (UI) module 510*a*, a printer module 510*b*, a scanner module 510*c*, a fax module 510*d*, a network module 510*e*, a supplies module 510*f*, and an error diagnosis module (Diagnostics) 520. As described above, the error diagnosis module 520 may be stored in a memory and loaded by the processor to execute an operation.

Each module including the UI module 510*a*, the printer module 510*b*, the scanner module 510*c*, the fax module 510*d*, the network module 510*e*, and the supplies module 510*f* may perform each function or operation of the image forming apparatus 500. In various examples, some modules may not be included or additional modules may be included according to the image forming apparatus. When an error occurs during the operation, each of the modules 510*a*, 510*b*, 510*c*, 510*d*, 510*e*, and 510*f* may record the error.

The error diagnosis module 520 may handle the error that occurred. As an example, the error diagnosis module 520 may diagnose, record, and handle the error according to a method set in a diagnosis setting module 521 regarding the error, and transmit information regarding the handling process and the handling result to the external apparatus. The error diagnosis module 520 may include the error diagnosis setting module (Diagnostics Configuration) 521, an error handling module (Error Handling) 522, a recording module 523, and a report module 524.

The error diagnosis setting module 521 may set the error diagnosis method according to a selection of a user. For example, the error diagnosis method may include an automatic mode 51, a manual mode 52, and a custom mode 53. The automatic mode 51 may refer to a method for automatically transmitting error information to an external apparatus when the error has occurred, receiving a solution from the external apparatus, and automatically applying the received solution. The manual mode 52 may be a method for performing error diagnosis when an error handling request is received from the user. In addition, the manual mode 52 may be a method for providing error items or solution items as a list and handling the error according to the selection of the user. The custom mode 53 may be a method for transmitting error information according to a selection of the user with respect to an error not detected by the error diagnosis to the external apparatus and receiving related solution information. In an example, the custom mode 53 may be a method for reporting result information of the error handling performed by the user, when there is no solution information in the external apparatus.

The error handling module 522 may handle the error in the automatic, manual, or custom mode according to a setting value of the error diagnosis setting module 521. In addition, the error handling module 522 may generate error information or error handling result information.

The recording module 523 may record information such as an error code, an error execution code, a type of an error handling, success or not of error handling, a time taken from the start to the end of the error handling, an error handling process, a description (comment), necessity or not of additional service, and the like. In an example, the error handling type may include any means for addressing a problem of the image forming apparatus such as a guide (e.g., a UI display, a guide document report output, etc.), a setting change, a patch downloading, a service, and the like.

The report module 524 may transmit the error handling result information to the external apparatus. In an example, the error handling result information may include priority order (e.g., an error handling score) information regarding the error handling result for each type.

As described above, the image forming apparatus 500 may communicate with the external apparatus in relation to the error handling. The external apparatus may be a server. Hereinafter, an example of a server will be described.

Figure 6:
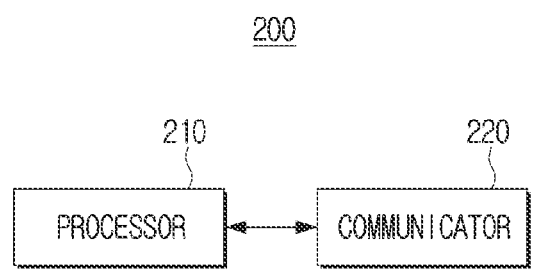
FIG. 6 is a block diagram illustrating a server according to an example.

FIG. 6 is a block diagram illustrating a server according to an example.

Referring to FIG. 6, the server 200 may include a processor 210 and a communicator 220.

The processor 210 may control an operation of the server 200. The processor 210 may receive error information from the image forming apparatus via the communicator 220. The processor 210 may identify an error category based on the received error information by using an artificial intelligence model. For example, when the received error information includes the error code, the processor 210 may identify the error category based on the error code. In addition, the processor 210 may identify the error category based on an input error-related message. The input error-related message may be a message input by the user (e.g., an administrator, a service engineer, etc.). In addition, the error category may be classified by using an AI cloud.

The processor 210 may provide a solution corresponding to the error information received form the image forming apparatus to the image forming apparatus based on the identified error category. The processor 210 may obtain solution information by using the artificial intelligence model based on the received error information. Alternatively, the processor 210 may transmit the received error information to the AI cloud via the communicator 220 and receive a solution related to the error information from the AI cloud. In an example, the processor 210 may provide a plurality of solutions arranged in order of priority. The priority order of the solutions may be applied based on error resolution results accumulated in the server 200 or set by updated scores. The processor 210 may transmit the solution to the image forming apparatus via the communicator 220 and receive the error handling result information from the image forming apparatus.

The processor 210 may update the solution based on the error handling result information. For example, the processor 210 may apply a negative (−) score to a solution which has not resolved the error and may apply a positive (+) score to a solution which has resolved the error among the provided solutions. In addition, the processor 210 may record the number of times of handling of the error, the number of times of success, the time taken for error handling, and the like with respect to each solution. The processor 210 may transmit the information regarding the error handling result to the AI cloud via the communicator 220 and the AI cloud may update the solution.

The communicator 220 may communicate with the external apparatus. For example, the external apparatus may include an image forming apparatus, an AI cloud, and the like. The communicator 220 may be formed to connect the server 200 to the external apparatus and may be connected via a wired communication port (e.g., a USB port, etc.) or a wireless communication port (e.g., WiFi 802.11a/b/g/n, NFC, Bluetooth), in addition to the connection to the external apparatus via a LAN or the Internet. Such a communicator 220 may be referred to as a communication interface or a transceiver.

The communicator 220 may transmit and receive the error information, the solution, and the error handling result information to and from the image forming apparatus. In an example, the communicator 220 may transmit and receive the error information, the updated solution, the error handling result information, and the like to and from the AI cloud.

Figure 7:
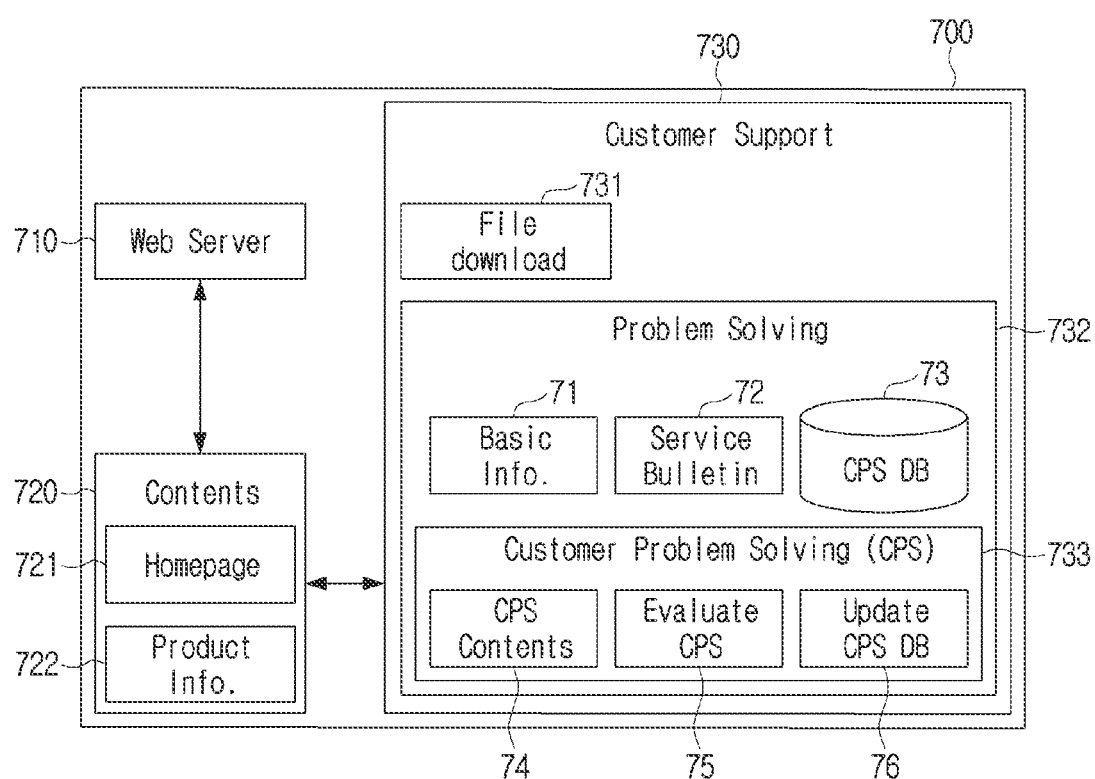
FIG. 7 is a block diagram illustrating operations of a server according to an example.

FIG. 7 is a block diagram illustrating operations of a server according to an example.

Referring to FIG. 7, a server 700 may include a web server module 710, a content module 720, and a customer support module 730. The server 700 may also include a memory. The memory may store instructions or various programs (e.g., software) regarding the server 700. In addition, the memory may store the web server module 710, the content module 720, the customer support module 730, an artificial intelligence model, and the like.

The web server module 710 may perform a web server function and process a hypertext transfer protocol (secure) (HTTP(S)) connection. In an example, the web server module 710 may establish communication with the image forming apparatus and an application. The web server module 710 may be replaced with another protocol for performing communication between the image forming apparatus and the server 700.

The content module 720 may process a uniform resource locator (URL) requested to an HTTP(S). The content module may provide a web page corresponding to a URL request regarding the HTTP(S) connection. The content module 720 may include a homepage 721, product information 722, data for customer support (e.g., manual, guide, firmware, driver, and the like), and the like.

The customer support module 730 may include a file downloading module 731 and a problem solving module 732. The problem solving module 732 may include a customer problem solving (CPS) module 733, a product basic information module 71, a manufacturer service bulletin module 72, and a CPS database 73.

The file downloading module 731 may perform a function for a user to download a web page, product information, data for customer support (e.g., manual, guide, firmware, driver, and the like), and the like.

The product basic information module 71 may be a module which provides information regarding a general problem of a product. In an example, the product basic information module 71 may provide basic information of a general product such as FAQ, Q&A, error category (e.g., set-up, UI, print, scan, copy, fax, system, network, security, supplies, driver, software, maintenance, and the like), and the like.

The manufacturer service bulletin module 72 may provide a solution which has resolved a problem occurring after product launch and a guide.

The CPS module 733 may manage problem solving information written by a user on the server or problem solving information received from the image forming apparatus with respect to the problem on the image forming apparatus. In an example, the CPS module 733 may include a CPS content module 74, a CPS evaluation module 75, and a CPS database update module 76.

The CPS content module 74 may provide a solution based on the error information received from the image forming apparatus. The server 700 may confirm the solution from the product basic information module 71, the manufacturer service bulletin module 72, and the CPS module 733 according to the error information received from the image forming apparatus. The server 700 may provide the solution to the image forming apparatus according to a priority order based on the score of the confirmed solution from each type.

The CPS evaluation module 75 may classify the error based on the received error information by using the artificial intelligence model. The CPS evaluation module 75 may be associated with the AI cloud including the artificial intelligence model in real time. The CPS evaluation module 75 may evaluate the data transmitted in real time, thereby increasing an identification accuracy of the error category. The CPS evaluation module 75 may reclassify the error information to be input later based on the classified category by using the artificial intelligence model, thereby increasing the identification accuracy of the error category.

The CPS database updating module 76 may convert an error that is able to be resolved by a setting change into a setting script based on the error handling result information to generate an execution file. The CPS database updating module 76 may update the CPS database 73.

The CPS database 73 may store the execution file generated in the CPS database updating module 76. In addition, the CPS database 73 may provide data for each function of the product. For example, the CPS database 73 may provide information such as an install error, a UI error, a printer error, a scanner error, a fax error, a network error, a system error, a security error, a management error, a supplies error, and the like.

The server 700 may provide various types of solution information with respect to one error that occurred at the image forming apparatus. For example, the server 700 may provide a basic information solution of the product from the product basic information module 71, a post service solution from the manufacturer service bulletin module 72, a CPS content solution from the CPS module 733, and the like to the image forming apparatus. The basic information solution of the product may be an error handling solution basically provided from the manufacturer, the post service solution may be a solution for providing a method for addressing the problem that occurred after product launch, and the CPS content solution may be a solution according to user Q&A, provided description (e.g., user comment), and the like.

A basic score may be applied to the solution for each type and the score may be updated according to the error handling result, thereby determining the priority order.

Figure 8:
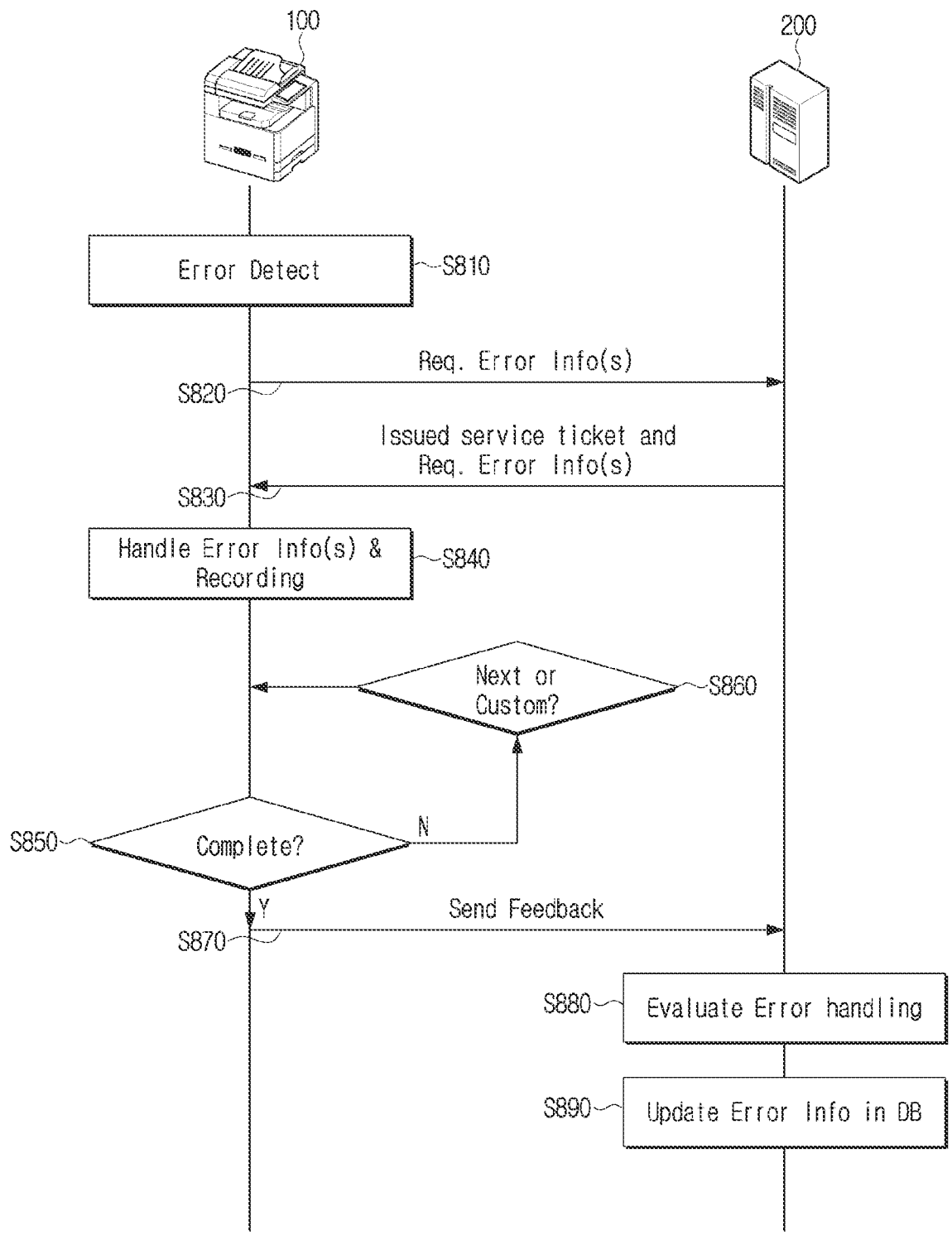
FIG. 8 is a sequence diagram illustrating operations of an image forming system according to an example.

FIG. 8 is a sequence diagram illustrating operations of an image forming system according to an example.

Referring to FIG. 8, the image forming apparatus 100 may detect an error in operation S810, and request the server 200 for information regarding the error in operation S820. As an example, the image forming apparatus 100 may transmit information regarding the error to the server 200 and request a solution regarding the error. As a method for the image forming apparatus 100 to request the server 200 for the solution regarding the error, a URL may be used or another protocol may be used. For example, the URL may include product information, and various pieces of error information regarding the solution. The product information may include model information, a serial number, and the like. The error information may include an error code, an error occurrence time, language information of error information, a firmware version, log information, and the like.

The server 200 may store the information received form the image forming apparatus 100 and issue a service ticket number to the image forming apparatus 100. The server 200 may transmit diagnosis information to the image forming apparatus 100 in operation S830. As an example, the server 200 may transmit the service ticket for identifying the image forming apparatus 100 which has requested the solution and the solution corresponding to the error to the image forming apparatus 100.

The image forming apparatus 100 may perform error handling based on the received solution in operation S840. The image forming apparatus 100 may record a process situation for each step of error handling. The image forming apparatus 100 may record a history from the time when the error handling has started (e.g., time when connected to a diagnosis mode of the server 200). The image forming apparatus 100 may record an error handling history according to a method set in an error diagnosis setting module. For example, the error handling history to be recorded may include a setting method (e.g., automatic/manual/custom), a problem solving target (e.g., image forming apparatus in the automatic mode/user in the manual mode or custom mode), an error handling start time, an error handling order, a time taken for error handling, an error handling result, an additional service necessity or not, a message input by the user, other detailed description (e.g., comment), and the like. The image forming apparatus 100 may handle an error with a solution having a first (e.g., highest) priority or a solution first selected.

The image forming apparatus may confirm whether error resolution is complete in operation S850. When the error resolution is not complete (S850-N), the image forming apparatus may handle the error with a solution having a next (e.g., second) priority or a solution selected next (e.g., second), or may convert the mode into the custom mode to handle the error in operation S860. When the error is complete (S850-Y), the image forming apparatus 100 may feed the handling result back to the server 200 in operation S870. In an example, when the error is handled by changing the first solution, the image forming apparatus 100 may feed the information indicating change of the first solution back to the server 200. The image forming apparatus 100 may feed the handling result back to the server 200 as the service ticket number issued from the server 200. For example, the handling result fed back to the server 200 may include an error execution code, an error handling method (e.g., application of a solution provided by the server (Provided)/application of a new solution (New)/application of change of the provided solution (Modified)), error solving or not, recorded error handling history, and the like. The image forming apparatus 100 may send a feedback regarding the handling result regarding each solution applied during the error handling process.

The server 200 may evaluate the error handling result based on the handling result received from the image forming apparatus 100 in operation S880. The server 200 may classify the type of the error handling and apply a score to the solution. For example, the type of the error handling may be classified based on the error handling method such as guide, setting change, patch downloading, and the like, and may also be classified based on the solution providing method such as the basic information solution of the product, the post service solution, and the CPS content solution.

In an example, a process for applying the score to the solution may be performed as follows. An initial score of the solution may be 80. When the error handling method is "Provided" which is information provided from the server 200, the server 200 may correct the score of the original solution. When the error handling method is "Modified" or "New" which is a method provided form the server 200, the server 200 may register a new solution and apply an initial score. When the error handling result indicates success, the server 200 may add 2 points to the original score, and when the error handling result indicates failure, the server 200 may subtract 2 points from the original score. When the error handling method is to provide a setting file to automatically enable the setting change problem solving, the server 200 may provide the setting as a script, thereby adding 10 points to the score of the corresponding solution.

The server 200 may record the number of times of error handling with respect to the solution and the number of times of success thereof, and provide the error handling time with the solution to the image forming apparatus 100 (e.g., Solution 1: from service engineer: Ignore this error (Score 98: 20 Successful/25 times, Estimated resolution time: 1 MIN).

The evaluation score processed manually may be additionally calculated by using an artificial intelligence model. For example, a weight may be applied to the score of the solution for improving reliability of the error handling and the weight of the solution that is frequently evaluated may be automatically increased.

The server 200 may update the database based on the evaluated error handling result in operation S890.

The example error handling method and image forming apparatus may enable classification of errors that occurred on the image forming apparatus, thereby addressing the error in real time. In addition, it is possible for the manufacturer to collect errors occurring on a product in various environments and conditions and to improve the solution regarding various problems, thereby improving maintenance and quality of the product. Further, an example error handling method and image forming apparatus may provide convenience to a user and a seller of the image forming apparatus.

Hereinabove, an example of an error handling method and apparatus have been described. Hereinafter, an example user interface of an image forming apparatus for performing error handling will be described.

FIGS. 9A to 9F are diagrams illustrating user interfaces (UIs) of an image forming apparatus regarding error handling according to an example. The description will be made with reference to FIGS. 9A to 9F. The UIs illustrated in FIGS. 9A to 9F are merely examples, and a menu item for providing a service, a menu tree, a menu UI, and the like may be provided in various forms according to the image forming apparatus or a person performing the error handling (e.g., a user, a service engineer, etc.).

Figure 9A:
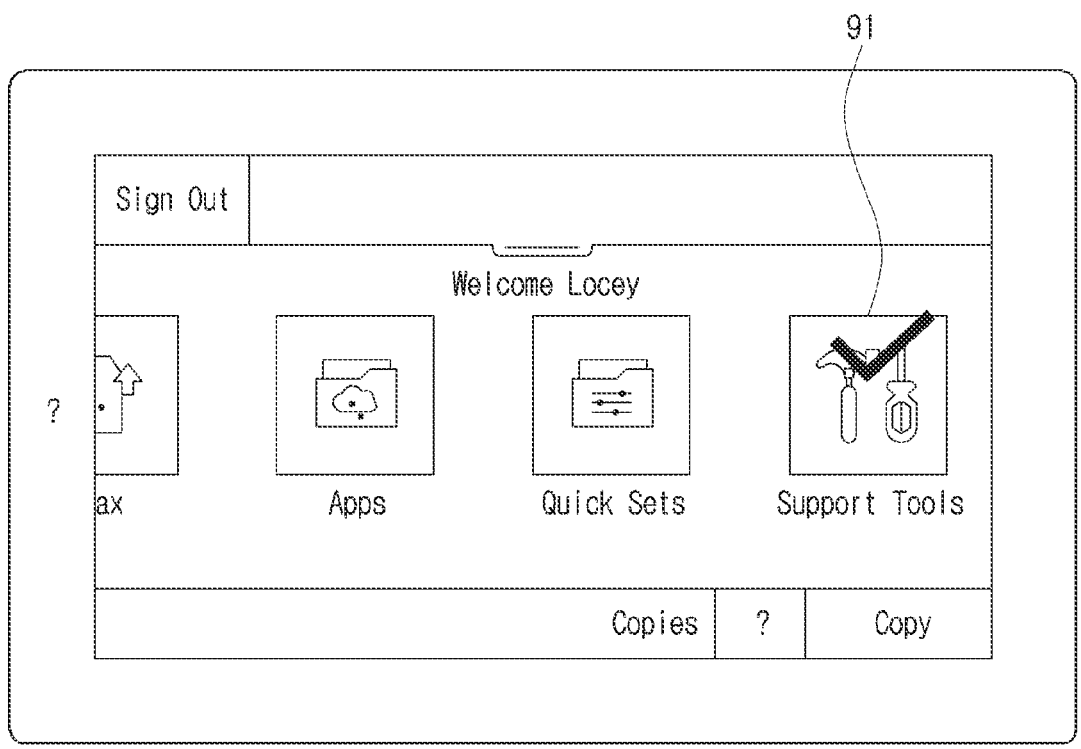
FIG. 9A is a diagram illustrating a user interface (UI) of a setting menu of an image forming apparatus according to an example.

FIG. 9A illustrates a UI of a setting menu according to an example. The setting menu may include a support tools item 91 for supporting a service to the user (e.g., a service engineer). The image forming apparatus may execute the support tools item 91 according to the selection of the user.

Figure 9B:
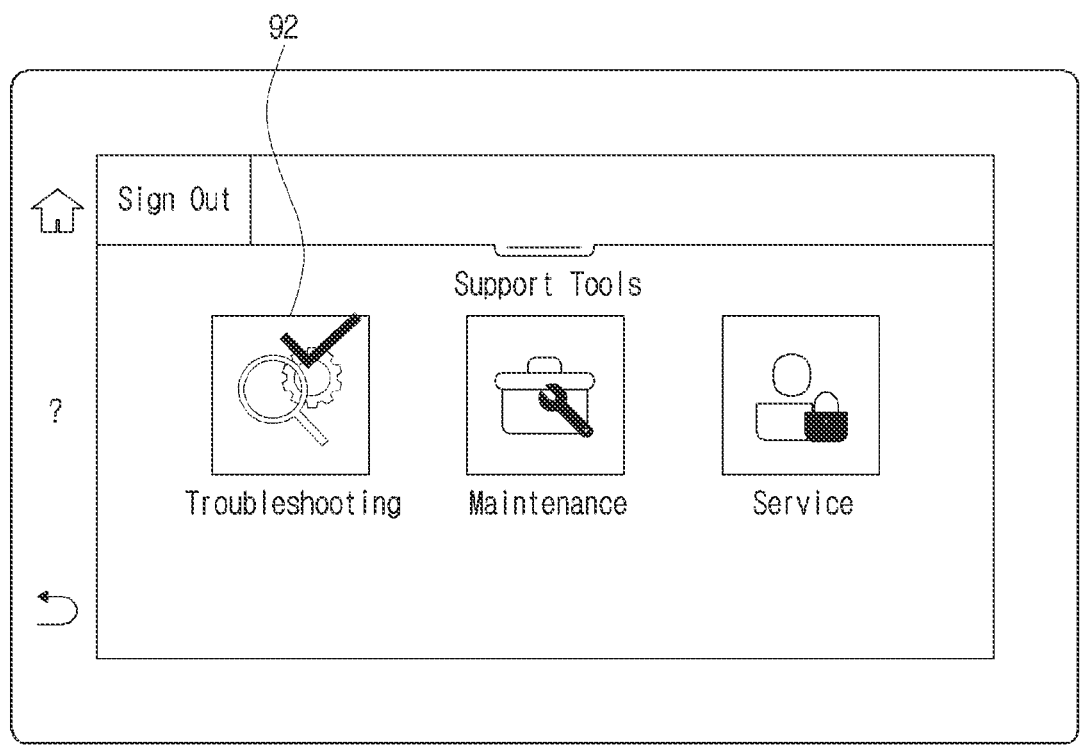
FIG. 9B is a diagram illustrating a UI of a support tool menu of an image forming apparatus according to an example.

FIG. 9B illustrates a UI of the support tools menu according to an example. The support tools menu may include a trouble shooting item 92 for handling an error of the image forming apparatus. The image forming apparatus may execute the trouble shooting item 92 according to the selection of the user.

Figure 9C:
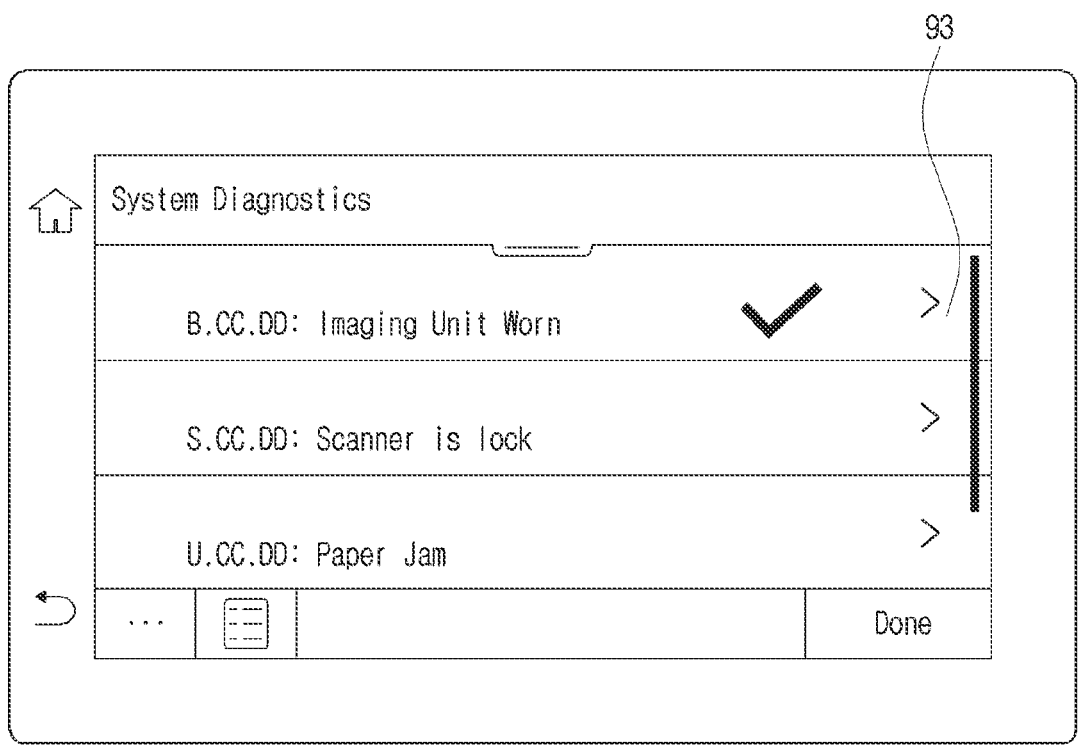
FIG. 9C is a diagram illustrating an error list UI of an image forming apparatus according to an example.

FIG. 9C illustrates an error list UI according to an example. On the image forming apparatus, one or a plurality of errors may occur. For example, an error "B.CC.DD: Imaging Unit Worn" may be an example of an error notifying that an image unit has reached the end of its lifetime, an error "S.CC.DD: Scanner is lock" may be an example of an error notifying that the scan operation may not be performed because the scanner is locked, and an error "U.CC.DD: Paper Jam" may be an example of an error notifying that the paper is not fed due to a paper jam on a tray. When the image forming apparatus is in the automatic mode, the image forming apparatus may automatically perform the error handling process in sequence. When the image forming apparatus is in the manual mode or the custom mode, the image forming apparatus may perform the error handling process according to the selection of the user. In an example, referring to FIG. 9C, an error item 93 of "B.CC.DD: Imaging Unit Worn" may be selected by the user. When the error item is selected, the image forming apparatus may transmit the error information to the server and receive the solution from the server.

Figure 9D:
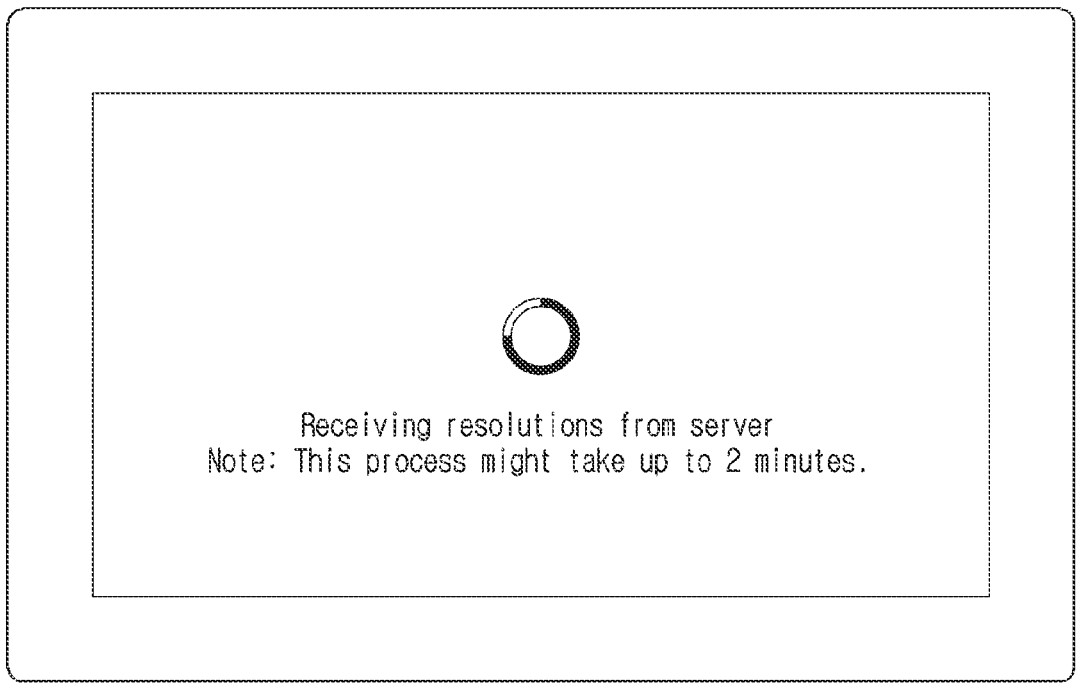
FIG. 9D is a diagram illustrating a UI indicating that an image forming apparatus receives a solution according to an example.

FIG. 9D illustrates a UI for receiving a solution according to an example. When the error item is selected, the image forming apparatus may display a UI indicating a standby state. The image forming apparatus may display the UI indicating the standby state, transmit the error information to the server, and receive the solution from the server. The image forming apparatus may record the process situation and information for each error handling step from the time when the error is selected or time when the error handling is started. The image forming apparatus may receive and output the solution regarding the selected error item 93 of "B.CC.DD: Imaging Unit Worn" from the server. In other words, the image forming apparatus may display the solution via the display or print the solution on a printing medium. In this specification, the term, "output" may include any operation of display via the display, sound output via a speaker, printing on a print medium, and the like.

Figure 9E:
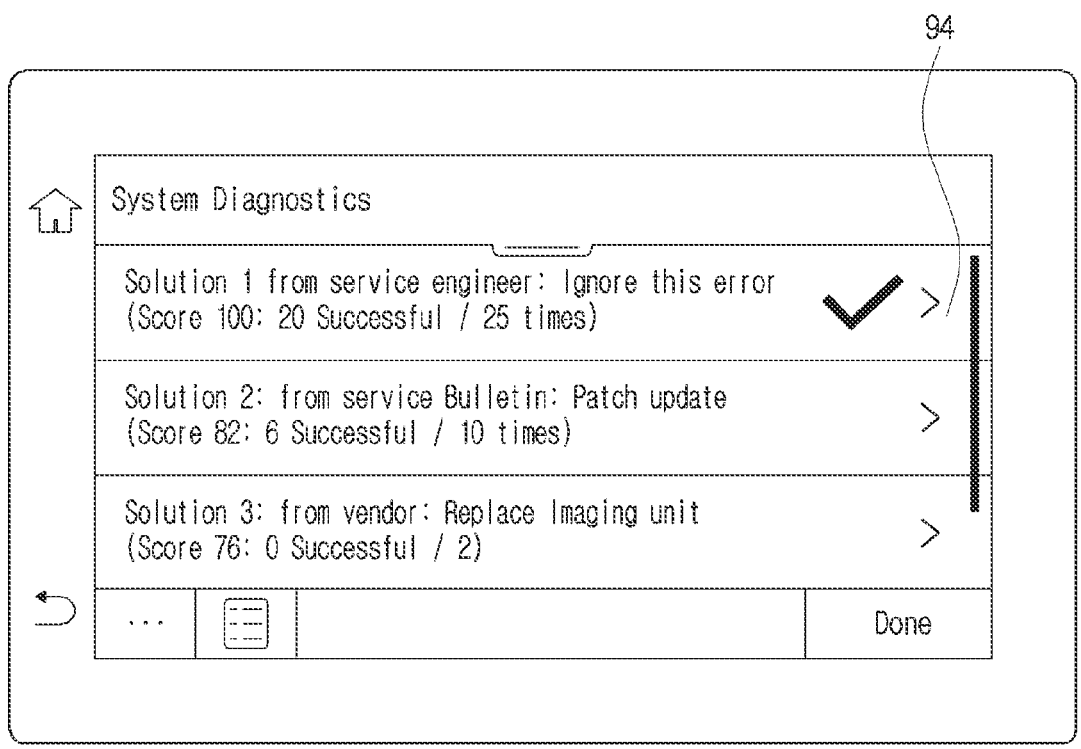
FIG. 9E is a diagram illustrating a solution list UI according to an example.

FIG. 9E illustrates a solution list UI according to an example. When the setting mode of the image forming apparatus is the manual mode or the custom mode, the image forming apparatus may output the provided solution as illustrated in FIG. 9E. The image forming apparatus may output the solution according to the priority order based on the score of the solution. Each solution may include information such as a score, a provider, an error handling method, the number of times of error handling, the number of times of error solving, the time taken for error handling, and the like. A first solution 94 having the highest priority may be selected by the user. The image forming apparatus may handle the error according to the selected first solution 94.

Figure 9F:
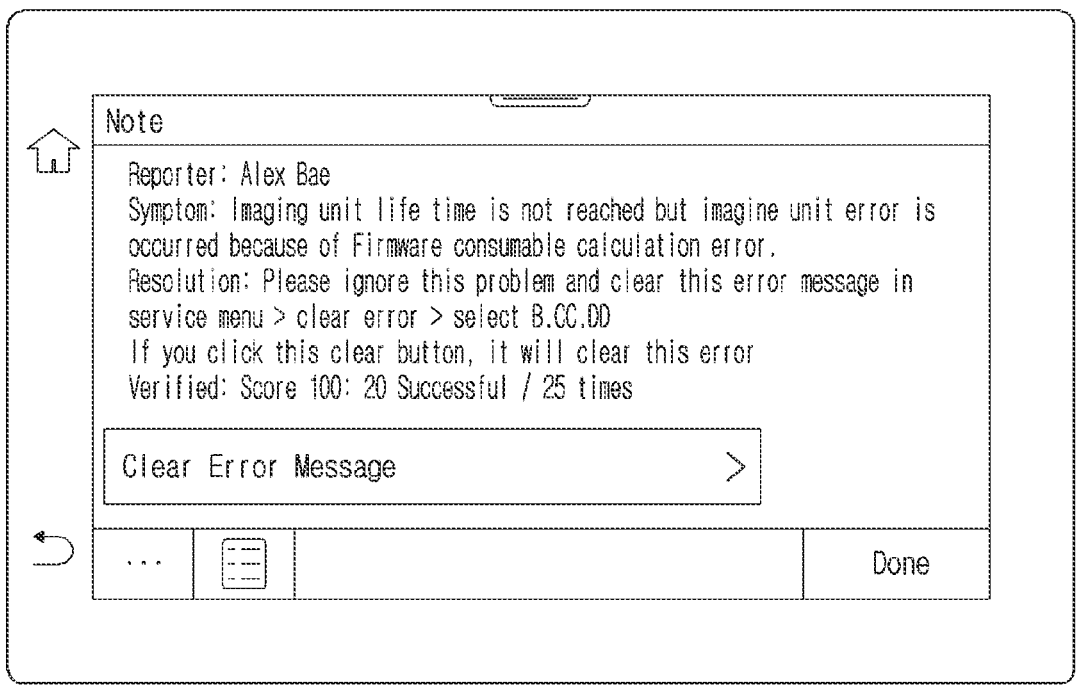
FIG. 9F is a diagram illustrating an error handling result UI according to an example.

FIG. 9F illustrates an error handling result UI according to an example. For example, the error handling result may include information such as a reporter (e.g., a user, a service engineer, an image forming apparatus automatically reporting, etc.), a symptom, a solving process, information regarding the applied solution, error solving or not, and the like. In addition, the image forming apparatus may transmit the error handling result information to the server. The server may update the solution based on the received error handling result information and update the artificial intelligence model.

Hereinafter, an example process of generating and updating an artificial intelligence model will be described.

Figure 10:
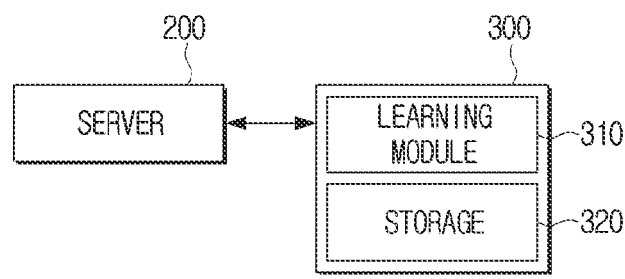
FIG. 10 is a block diagram illustrating a process of learning a solution due to an error using machine learning according to an example.

FIG. 10 is a block diagram illustrating a process of learning a solution due to an error using machine learning according to an example.

FIG. 10 illustrates the server 200 and the AI cloud 300. The AI cloud 300 may include a learning module 310 and a storage 320.

The server 200 may provide error information and original error handling result information to the AI cloud 300. The learning module 310 of the AI cloud 300 may be primarily trained based on the provided information. The learned content may be stored in the storage 320.

For example, the error information for learning may include product information, log information, setting information, an error code, an input error-related message, and the like. The error handling result information may include information such as an error execution code, setting information, an error category, a type of error handling, error handling success or not, a time taken from the start to the end of the error handling, an error handling process, a description (comment), additional service necessity or not, and the like. In an example, the artificial intelligence model may be trained by applying weights to some information. For example, the artificial intelligence model may be trained by applying weights to information such as an error handling frequency, an importance of an error, a seriousness of an error, an error occurrence time, an error resolving frequency, a time taken for error resolving, region information, and the like, when learning the solution.

The server 200 may provide more error information and error handling result information to the AI cloud 300. The learning module 310 of the AI cloud 300 may collect information not standardized, analyze the non-standardized information, generate each type, and apply an optimal solution for handling the error in the future to the artificial intelligence model to improve the solution.

The AI cloud 300 may generate the artificial intelligence model optimized to the error handling system via continuous training and automatically update the optimal solution. The AI cloud 300 may automatically classify main error information according to the error execution code by using the artificial intelligence model based on information. The AI cloud 300 may identify error information with different main error messages to the same type by using the artificial intelligence model trained with standardization. In other words, the artificial intelligence model may automatically classify the error category through the training.

For example, the artificial intelligence model may classify the errors with the same error code to the same category. In an example, the user may input a message with various expressions such as "paper jammed," "abnormal paper feeding," "paper is not fed," and the like. The trained artificial intelligence model may identify the same error which is "paper jam" and the error category from the various messages.

The generated artificial intelligence model may be stored in the storage 320. The artificial intelligence model may be reused as a learning model of another artificial intelligence model providing different solutions according to an image forming apparatus model, thereby increasing consistency. The AI cloud 300 may automatically update the solution according to a new image forming apparatus model generated in the future and change of the option.

Figure 11:
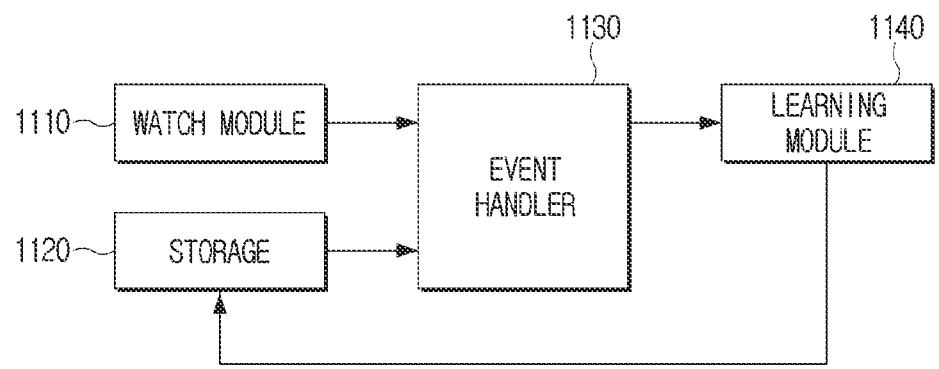
FIG. 11 is a block diagram illustrating a process of updating a solution due to an error using machine learning according to an example.

FIG. 11 is a block diagram illustrating a process of updating a solution due to an error using machine learning according to an example.

Referring to FIG. 11, the AI cloud may include a watch module 1110, a storage 1120, an event handler 1130, and a learning module 1140. The server may receive the error information from the image forming apparatus and provide the solution corresponding to the error to the image forming apparatus based on the trained artificial intelligence model. The server may receive the error handling result information from the image forming apparatus. The server may transmit the received error information and error handling result information to the AI cloud to update the artificial intelligence model.

The watch module 1110 may transmit a trigger signal to the event handler 1130 periodically. The storage 1120 may transmit the artificial intelligence model to the event handler 1130, when an event occurs. In other words, when an event that the AI cloud receives the error handling result information from the server occurs, the event handler 1130 may transmit the error handling result information and the original artificial intelligence model to the learning module 1140. The learning module 1140 may update the artificial intelligence model based on the error information and the error handling result information and store the updated artificial intelligence model in the storage 1120. The updated artificial intelligence model may be used in the error handling of the image forming apparatus.

While examples of the disclosure have been shown and described, the disclosure is not limited to the aforementioned examples and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An error handling method comprising:
   detecting an error in an image forming apparatus;
   transmitting error information regarding the detected error to an external apparatus;
   identifying an error category based on the error information;
   providing a solution corresponding to the error information to the image forming apparatus based on the identified error category;
   applying the provided solution at the image forming apparatus;
   transmitting result information obtained by applying the provided solution at the image forming apparatus to the external apparatus; and
   updating the provided solution at the external apparatus based on the result information.

2. The error handling method according to claim 1, wherein the error information comprises product information, log information, setting information, an error code, or an input error-related message.

3. The error handling method according to claim 2, wherein the identifying of the error category comprises identifying one error category corresponding to the error information among a plurality of error categories by applying the error code or the input error-related message to an artificial intelligence model.

4. The error handling method according to claim 1, wherein the providing of the solution to the image forming apparatus comprises:
   identifying two solutions related to the error information among a plurality of solutions, each of the plurality of solutions set with a score;
   confirming a priority order of the two solutions based on the respective set scores of the two solutions; and
   providing the two solutions in an order of the priority.

5. The error handling method according to claim 1, further comprising:
   setting a score based on an error resolution result by applying each of a plurality of solutions to an artificial intelligence model,
   wherein the setting of the score comprises applying a weight to the score based on an error occurrence frequency, an importance of an error, a seriousness of the error, an error occurrence time, an error resolution frequency, a time taken for error resolution, or region information.

6. The error handling method according to claim 1, wherein the result information comprises error resolution information, information indicating that an error is not resolved, or an action message related to resolution of an error.

7. The error handling method according to claim 6, wherein the updating comprises:
   subtracting points from a score of a first solution including the information indicating that an error is not resolved;
   adding points to a score of a second solution including the error resolution information;
   updating a priority order of the solutions based on the added and subtracted scores; and
   updating the solutions based on the action message related to resolution of an error.

8. The error handling method according to claim 1, wherein the transmitting of the error information to the external apparatus comprises transmitting the error information based on a set error handling method.

9. The error handling method according to claim 8, wherein the set error handling method comprises an automatic mode for automatically transmitting the error information, a manual mode for outputting the error information and transmitting the error information according to selection of a user, or a custom mode for transmitting an input error-related message.

10. A server comprising:
    a communicator to communicate with an external apparatus; and
    a processor, wherein the processor is to:
       receive error information regarding an error that occurred at an image forming apparatus via the communicator,
       identify an error category based on the received error information,
       provide a solution corresponding to the error information based on the identified error category to the image forming apparatus via the communicator,
       receive result information obtained by applying the solution from the image forming apparatus via the communicator, and
       update the solution based on the received result information from the image forming apparatus.

11. The server according to claim 10,
    wherein the error information comprises product information, log information, setting information, an error code, or an input error-related message, and
    wherein the processor is to identify one error category corresponding to the error information among a plurality of error categories by applying the error code or the input error-related message to an artificial intelligence model.

12. The server according to claim 10, wherein the processor is to:
    identify two solutions related to the error information among a plurality of solutions each of the plurality of solutions set with a score,
    confirm a priority order of the two solutions based on the respective set scores of the two solutions, and
    provide the two solutions in an order of a priority to the image forming apparatus via the communicator.

13. The server according to claim 10, wherein the processor is to:
    set a score based on an error resolution result by applying each of a plurality of solutions to an artificial intelligence model, and
    apply a weight to the score based on an error occurrence frequency, an importance of an error, a seriousness of the error, an error occurrence time, an error resolution frequency, a time taken for error resolution, or region information.

14. The server according to claim 10,
    wherein the result information comprises error resolution information, information indicating that an error is not resolved, or an action message related to resolution of an error, and
    wherein the processor is to:
       subtract points from a score of a first solution including the information indicating that an error is not resolved,
       add points to a score of a second solution including the error resolution information,
       update a priority order of the solutions based on the added and subtracted scores, and
       update the solutions based on the action message related to resolution of an error.

15. A non-transitory computer-readable recording medium on which a program for performing an error handling method is recorded, the non-transitory computer-readable recording medium comprising:
    instructions to receive error information regarding an error that occurred at an image forming apparatus;
    instructions to identify an error category based on the received error information;
    instructions to provide a solution corresponding to the error information based on the identified error category;
    instructions to receive result information obtained by applying the solution; and
    instructions to update the solution based on the received result information.

* * * * *